G. H. MENZIES.
LUBRICATOR.
APPLICATION FILED AUG. 8, 1910.

987,735.

Patented Mar. 28, 1911.

Witnesses:

Inventor,
George H. Menzies,
By Richard D. Harrison
his Attorney.

UNITED STATES PATENT OFFICE.

GEORGE H. MENZIES, OF PITTSBURG, PENNSYLVANIA.

LUBRICATOR.

987,735.  Specification of Letters Patent.  Patented Mar. 28, 1911.

Application filed August 8, 1910.  Serial No. 576,068.

*To all whom it may concern:*

Be it known that I, GEORGE H. MENZIES, a citizen of the United States, residing at Pittsburg, N. S., in the county of Allegheny and State of Pennsylvania, have invented certain new and useful Improvements in Lubricators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of lubricators wherein grease or other lubricants of a thick character is employed, the invention being particularly applicable to such devices wherein a screw plug is employed in connection with the receptacle for the purpose of applying pressure to the body of lubricant to insure the same being fed to the journal or other bearing to which the device is applied.

Lubricating devices of this character are now in use upon the drive and connecting rods and pins, and other bearings, of locomotives and other moving machinery, the feed plug, at intervals, being turned slightly to feed a small quantity of the lubricant to the bearing, and it has been found that with the effects of the constant jarring and vibrating of such moving parts to which they are applied, the plugs become unscrewed and, particularly where used upon locomotives, the plugs become displaced and lost, thus occasioning the replacing of the same, and where a great number are in use the loss entails considerable expense as well as causing the device to become inoperative, resulting in heated bearings. Efforts have been made to remedy this loss and annoyance by applying a jam-nut to the plug, but this has proven a failure, displacement and loss still occurring.

The object of my invention is to provide a simple and practical means for locking the plug in the position placed, thus overcoming the objections referred to.

With the above object in view, the invention consists in the novel arrangement and application of parts as hereinafter more fully described in this specification and pointed out in the appended claims.

Figure 1:
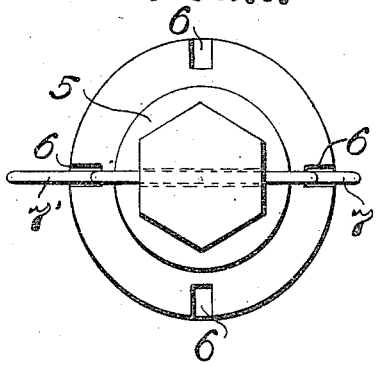
Figure 2:
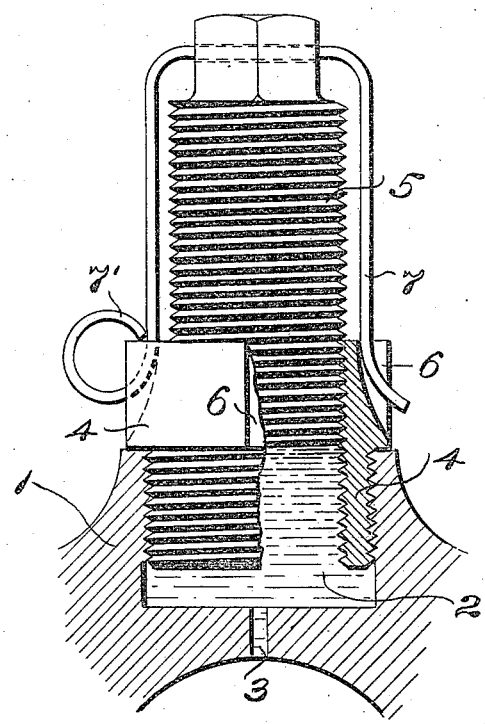

In describing the invention in detail, reference is to be had to the accompanying drawing forming a part of this specification, wherein like detail parts are designated by like reference characters, in which drawings, Figure 1, is a plan view of a lubricator having my improvements applied thereto. Fig. 2, is a side elevation of the same, partly in section.

In said drawings the reference numeral 1 indicates the bearing or connecting end of a rod or other member surrounding a journal, within which is formed a suitable receptacle containing the lubricating material 2, communication with the bearing proper being had through the small orifice 3. Threadably secured within said bearing receptacle is a bushing 4 within which is arranged a threaded screw plug 5, adapted to be turned to apply pressure to the lubricant and feed the same through the orifice 3 to the bearing proper, said bushing being provided with a plurality of spaced vertically-disposed slots 6 about the shouldered portion thereof, which parts are old in the art and the same as are in use upon the drive rod and pin connecting bearings of many locomotives and other moving machinery.

To apply my invention to the above structure, I form a transversely disposed opening through the top of the plug.

My invention consists of an inverted approximately U shaped locking member 7, the extreme ends of the legs thereof being slightly curved outwardly, the curvature at the end of one leg being continued to form a loop 7′. The member is yieldable, preferably formed of spring wire, and is pivotally suspended, at its intermediate portion, from the plug 5 by being passed through the transverse opening formed at top thereof previous to the bending down of one of its legs, the ends of said member, or its legs, in practice, engaging in opposite slots of the bushing, as shown.

It will be readily apparent that while the plug is in the locked position, as shown, the same cannot rotate through the effects of vibration of jarring, thereby being retained in the position desired. When it is desired to adjust or remove the plug, as the case may be, the finger of the attendant or an implement is inserted within the loop portion of the lock and that extremity thereof drawn outward sufficiently to disengage the same from the slot, after which the plug may readily be adjusted or removed.

Having thus shown and described my invention, what I claim and desire to secure by Letters Patent, is:

1. In a lubricator, the combination with the screw plug and the threaded member within which the plug operates, the member having a plurality of spaced slots formed thereabout, of a locking member comprising an inverted approximately U shaped spring member pivotally suspended at its intermediate portion from said plug and having each leg thereof engaging in one of the slots of the threaded member.

2. In a lubricator, the combination with the screw plug and the threaded member within which the plug operates, said screw plug having a transverse opening extending through the top thereof and said threaded member having a plurality of spaced slots formed thereabout, of a locking member comprising an inverted approximately U shaped spring member extending through the transverse opening of and pivotally suspended from said plug at its intermediate portion and having each leg thereof engaging in one of the slots of the threaded member.

3. In a lubricator, the combination with the screw plug and the threaded member within which the plug operates, said screw plug having a transverse opening extending through the top thereof and said threaded member having a plurality of vertically-disposed spaced slots formed thereabout, of a locking member comprising an inverted approximately U shaped spring wire member extending through the transverse opening of and pivotally suspended from said plug at its intermediate portion and having each leg thereof engaging in one of the slots of the threaded member, one leg of said locking member having a loop formed on its extremity.

In testimony whereof I affix my signature, in presence of two witnesses.

GEORGE H. MENZIES.

Witnesses:
D. B. OAKS,
THOMAS R. LOUGHREY.

---

Copies of this patent may be obtained for five cents each, by addressing the "Commissioner of Patents, Washington, D. C."